United States Patent [19]
Baranowski et al.

[11] Patent Number: 5,255,478
[45] Date of Patent: Oct. 26, 1993

[54] MODULAR INSTITUTIONAL WORKSTATIONS

[75] Inventors: James P. Baranowski, Waterford, Wis.; Daniel J. De Vries, Middleville, Mich.; Gene T. Plitt, Muskego, Wis.

[73] Assignee: Bay View Industries, Inc., Oak Creek, Wis.

[21] Appl. No.: 915,083

[22] Filed: Jul. 16, 1992

[51] Int. Cl.$^5$ .............................................. A47B 5/00
[52] U.S. Cl. ..................... 52/36.1; 52/36.2; 52/364; 52/36.5; 52/36.6; 52/239; 160/135; 160/351; 312/111
[58] Field of Search .................. 52/36.1–36.6, 52/239; 160/135, 351

[56] References Cited

U.S. PATENT DOCUMENTS

| | | |
|---|---|---|
| D. 248,807 | 8/1978 | Canfield . |
| D. 281,294 | 11/1985 | Hoppe . |
| D. 283,092 | 3/1986 | Johnston . |
| 2,688,525 | 9/1954 | Lindstrom . |
| 2,930,665 | 3/1960 | Budai ........................ 312/111 |
| 3,356,434 | 12/1967 | Theodores .................. 312/111 X |
| 3,885,845 | 5/1975 | Krieks . |
| 3,953,093 | 4/1975 | Hero . |
| 4,066,305 | 1/1978 | Gazarek . |
| 4,080,022 | 3/1978 | Canfield . |
| 4,116,509 | 9/1978 | Smith . |
| 4,326,760 | 4/1982 | Ziegelheim . |
| 4,378,137 | 3/1983 | Gibson . |
| 4,433,884 | 2/1984 | Edwards . |
| 4,536,044 | 8/1985 | Ziegelheim . |
| 4,586,759 | 5/1986 | Wrobel . |
| 4,639,049 | 1/1987 | Frascaroli . |
| 4,852,500 | 8/1989 | Ryburg . |
| 4,886,326 | 12/1989 | Kuzyk . |
| 5,016,405 | 5/1991 | Lee . |

Primary Examiner—Richard E. Chilcot, Jr.
Assistant Examiner—Beth A. Aubrey
Attorney, Agent, or Firm—Whyte & Hirschboeck

[57] ABSTRACT

Workstations with the look and feel of millwork but with the flexibility of systems furniture comprise modules constructed from a relatively few number of elements. The modules are based on several basic geometries, and comprise a horizontal work surface, a forward support panel assembly, and end panel assemblies. In addition, each module can be equipped with transactional shelves and various accessories, e.g. pull-out writing shelves and pencil drawers, drawer pedestals, courtesy shelves, lighting, etc. The elements of the modules are constructed from durable materials that are easy to maintain and clean. Certain embodiments of these workstations are particularly well adapted for use in health care settings.

14 Claims, 13 Drawing Sheets

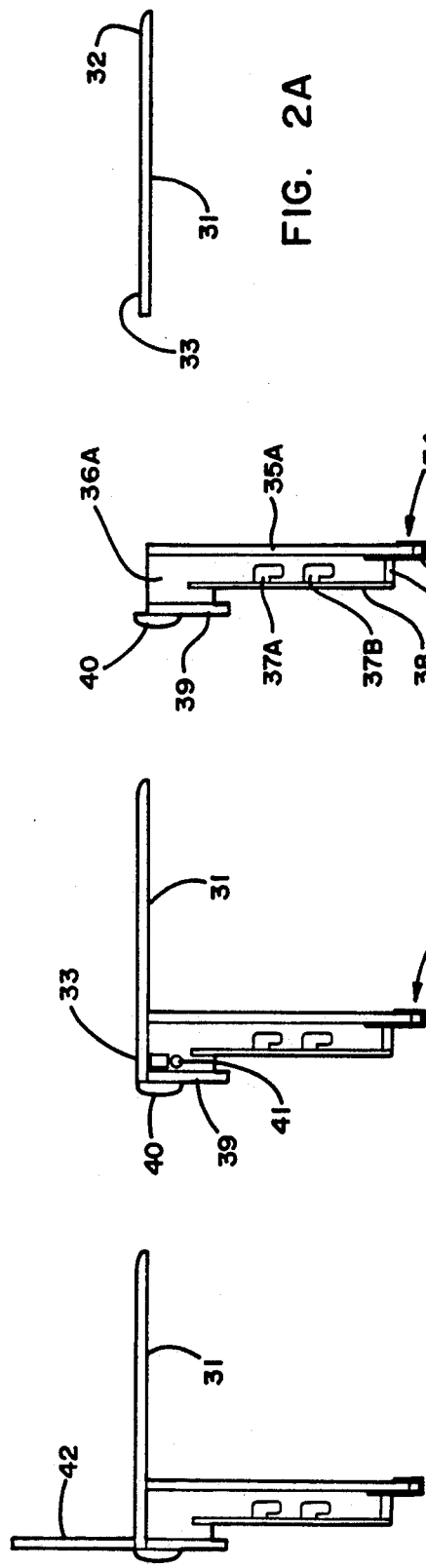

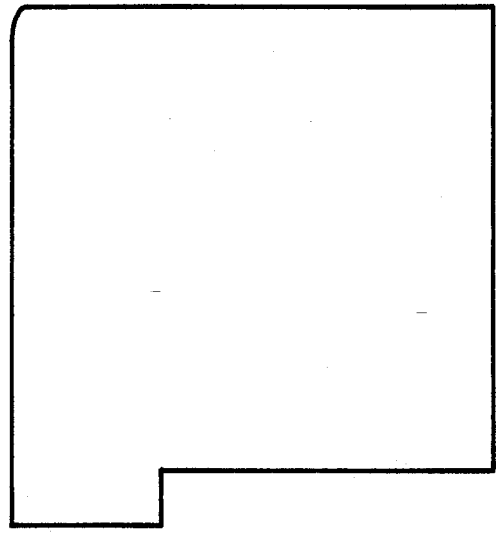
FIG. 3C
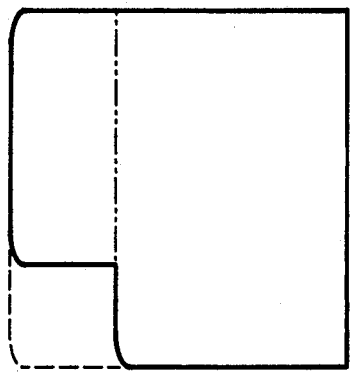
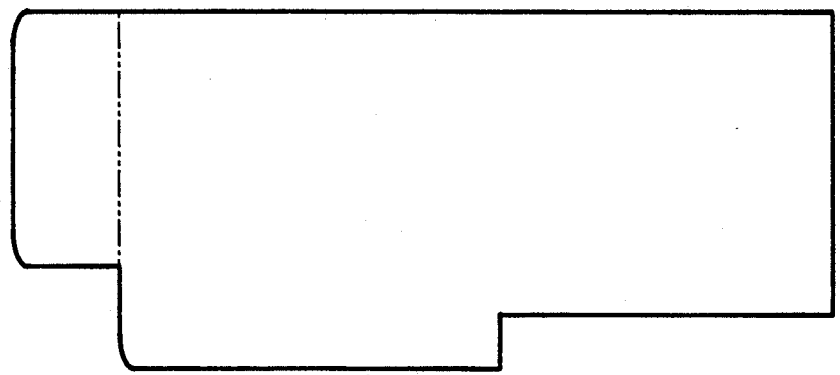
FIG. 3D
FIG. 3B
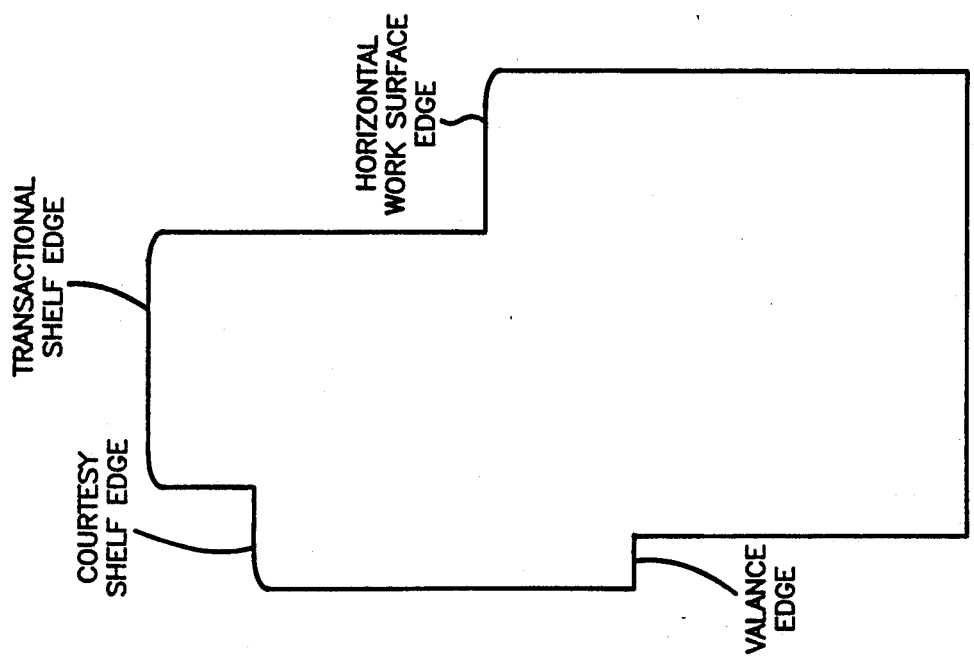
FIG. 3A
TRANSACTIONAL SHELF EDGE
HORIZONTAL WORK SURFACE EDGE
COURTESY SHELF EDGE
VALANCE EDGE

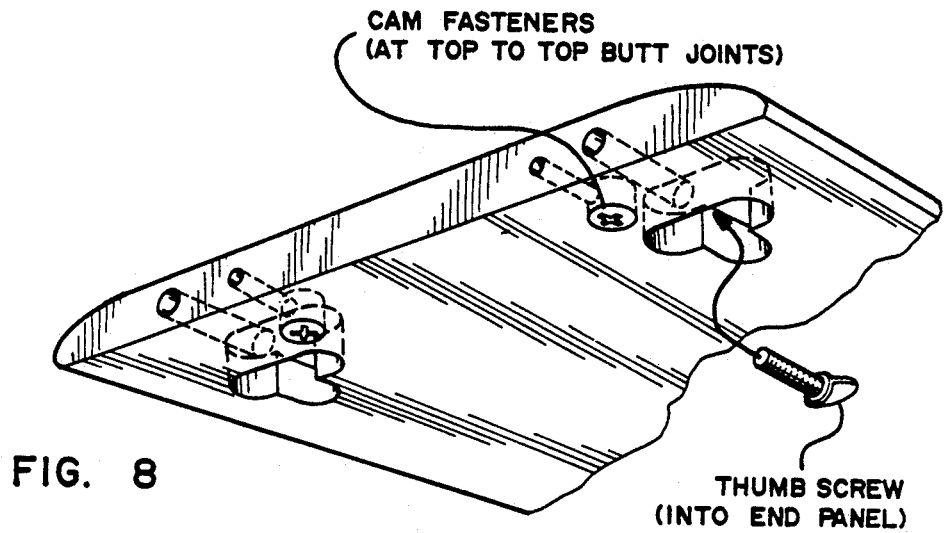
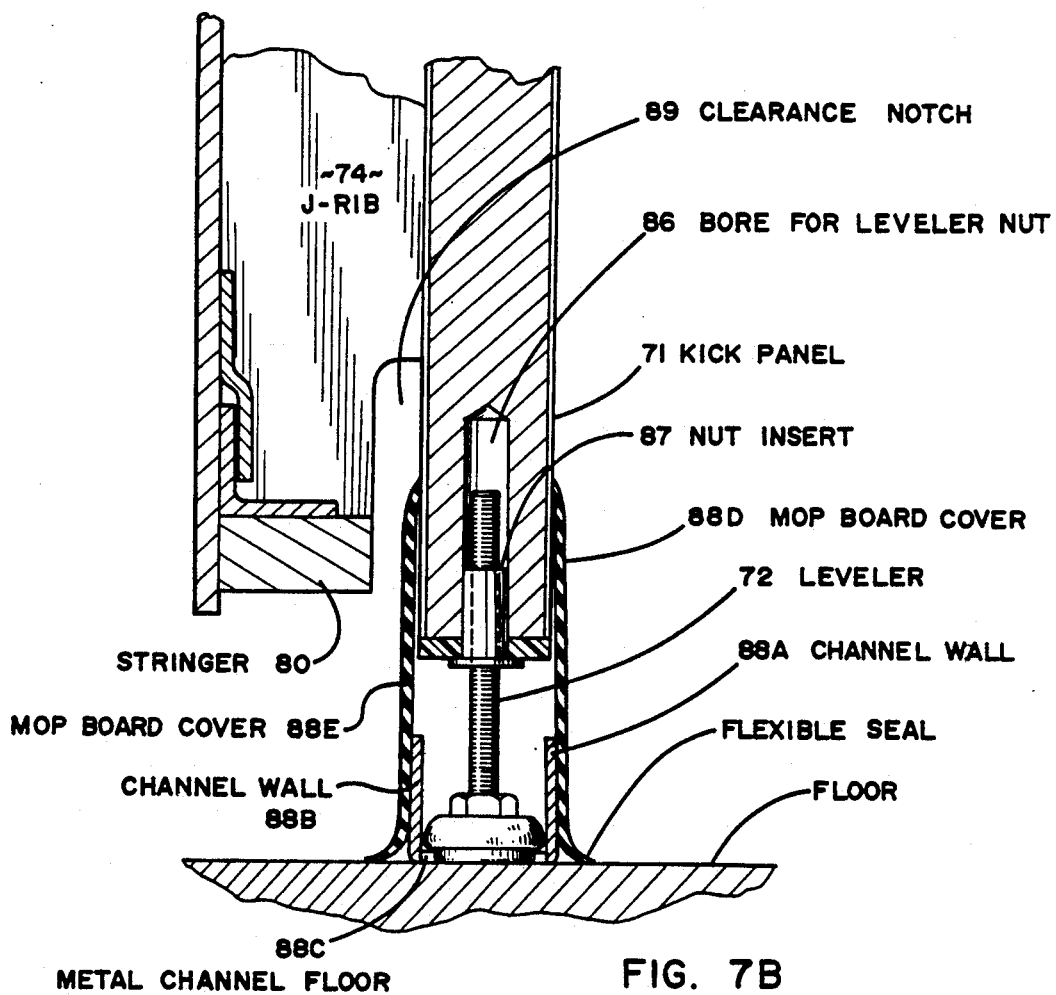

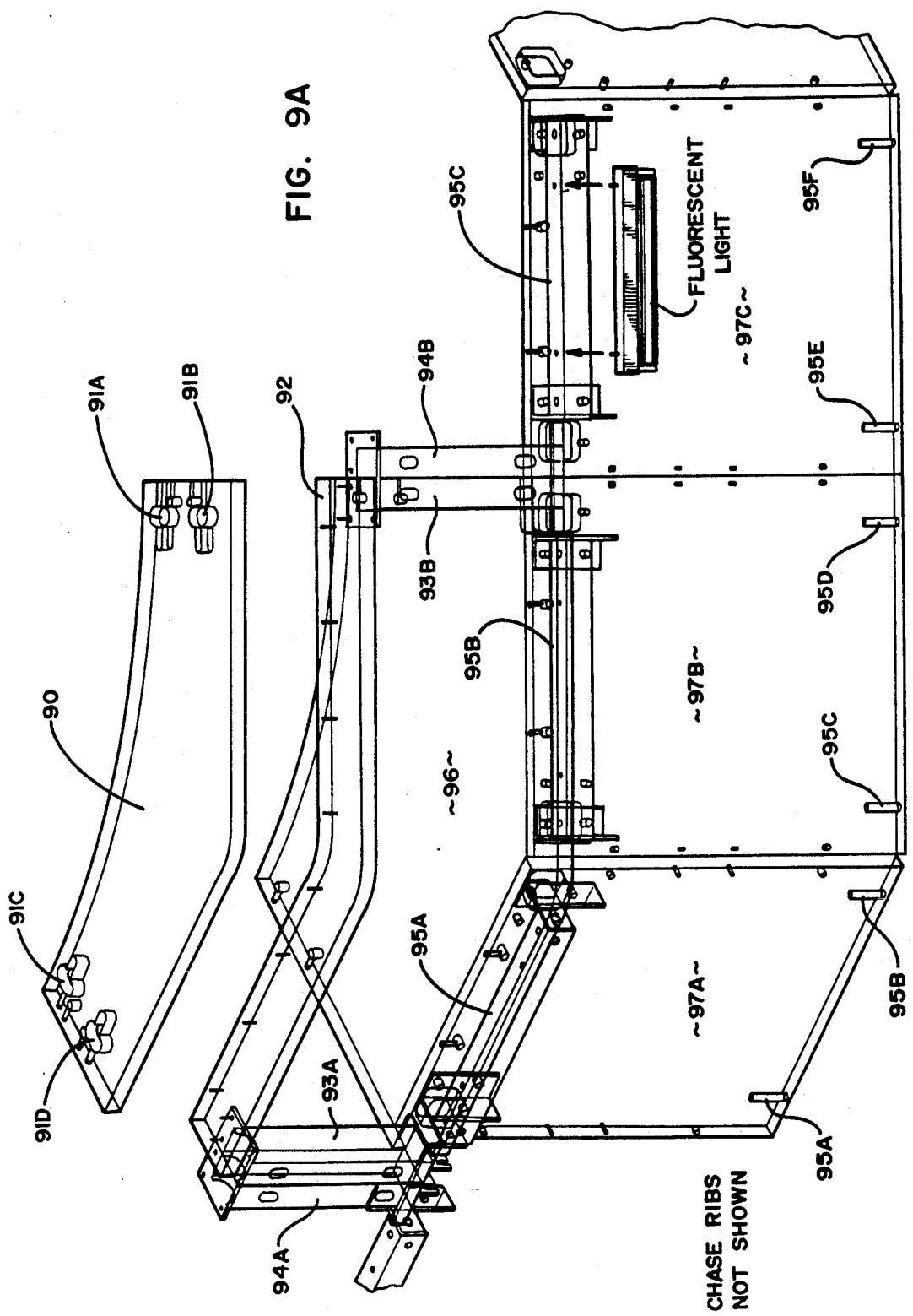

MODULAR INSTITUTIONAL WORKSTATIONS

BACKGROUND OF THE INVENTION

This invention relates to workstations. In one aspect, this invention relates to modular workstations for use in institutional settings while in another aspect, this invention relates to modular institutional workstations that comprise relatively few subassemblies or stock-keeping units, are easily assembled in the field, and have the look and feel of architectural millwork but with the flexibility of systems furniture.

Present day institutional workstations fall into one of two broad categories, millwork and systems furniture. As with all things, both have advantages and disadvantages.

For millwork, the advantages include the ability to custom fit workstations into odd architectural spaces; freedom for architects and designers to match the workstation with their other interior designs, materials and finishes; and creating a workstation with a substantial mass that imparts a permanent look to it. The disadvantages include quality variations as a result of quality variations in local craftmanship; lack of flexibility to respond, without new construction, to new technology, staffing or procedures; generally poor performance of materials and construction relative to infection control; site fabrication noise, dust, adhesive and solvent fumes; relatively long installation times with concurrent downtime for the space involved; difficult to move or adapt to new sites or new functions; lack of durability, particularly with respect to laminate surfaces and edging; numerous design and dimensional decisions each time a new workstation is required; and generally lighting and other accessories are not included in the construction.

These disadvantages manifest themselves early and often in settings of heavy use and rapid change. For example in health care centers, perfectly functional nursing stations are often ripped out and discarded when the nursing floor changes from one medical use to another Since the millwork counters are custom built, they do not lend themselves to easy or economical reconfiguration for use elsewhere in the same site, or even elsewhere in the same facility, and typically leave raw floors that must be patched and refinished.

Moreover, each time an opportunity develops to build another counter or station, older drawings are typically reissued and upgraded to reflect new details, colors and styles. This usually results in a broad inventory of one-of-kind workstations with each having different parts and pieces. This, in turn, results in a worksite with little visual continuity and little physical interchangeability. Consequently, building owners and managers find that they often have to change counters and workstations to upgrade them visually even though the counters and workstations are still functional.

The alternative to many of these problems is, of course, the use of systems furniture. The obvious advantages of system furniture for workstations include their ease of reconfiguration, relative to millwork; they often include prewired electrical systems and lighting; they offer a variety of components and user-oriented accessories; they are easily matched or coordinated with the worksite and other worksite furniture and equipment; and their on-site assembly, relative to millwork, is less intrusive. Furniture systems have proven a viable option in relatively stable, light traffic areas, such as office settings.

The disadvantages of furniture systems, particularly in heavy use institutional settings, include too few subassemblies and too many parts and pieces (i.e. the basic building elements of the workstations) which not only makes ordering and inventory maintenance difficult, but can also complicate on-site assembly; the presence of many joints which makes for difficult cleaning, particularly in health care facilities; finishes and materials that are generally designed for aesthetic appeal and light use; and an insubstantial mass which makes for a nonpermanent look. Moreover, systems furniture often does not address emergency power distribution which can result in the addition of electrical chases that not only compromise some aspect of the workstation utility, but also its aesthetic appeal.

Faced with essentially two choices of workstations, a building owner or manager must often choose a product that only partially meets the needs of the worksite, particularly in an institutional setting. Ideally, the owner or manager would like a workstation that incorporates most, if not all, of the advantages of both millwork and furniture systems with none of their concomitant disadvantages. Such a workstation would be comprised of relatively few subassemblies which can be easily assembled or reconfigured at the worksite. Assembly and reconfiguration would be quick, clean and dry; it would not require any special skills, training or tools; and reconfiguration would typically require few, if any, additional parts. The workstation would have the look and feel of millwork, but the flexibility of systems furniture. It would be either prewired or ready for wiring at the site, constructed of institutional-grade materials and finishes and where appropriate, and it would be designed to accommodate various electrical requirements, including emergency power cabling. The design would exhibit a concern for new technologies and ergonomics and aesthetically, it would be relatively neutral for compatibility with many styles. For health care settings, the construction and materials would address disease and infection control.

SUMMARY OF THE INVENTION

The advantages of both millwork and systems furniture workstations, without many of their concomitant disadvantages, are provided by the institutional workstations of this invention. These workstations are modular systems with the look and feel of architectural millwork, but with the reconfiguration flexibility of systems furniture. They comprise relatively few subassemblies which make their planning and ordering by end-users simple relative to both millwork and systems furniture. They are designed not only for flat shipping and storage, but also for facile and clean on-site assembly with conventional hand tools by unskilled or low skilled labor. These workstations are also designed and detailed for clean, sanitary maintenance.

The workstations of this invention comprise subassemblies and elements that include:

A. A horizontal work surface with a forward edge and at least two straight side edges; B. A forward, vertical support subassembly comprising:
1. A kick panel equipped with a glide which is securely affixed to the lower edge of the panel and upon which the subassembly and workstation rests;

2. a generally rectangular fishhook-shaped rib, also referred to as a J-rib, which is securely affixed to one wall of the kick panel in an inverted manner such that the base of the J is proximate to the horizontal work surface and the top of the extended arm of the J is proximate to the glide, the surface of the extended arm most removed from the kick panel shaped with at least one J-pocket through and in which wiring and utilities can be strung and supported, the base of the J notched such that a chase cover can be inserted and in combination with a lower fastening means, can be held in close approximation to the surface of the extended arm of the J shaped with the J-pockets;

3. A bottom stringer which extends for the substantial length of the kick panel and is securely affixed to the top of the inverted J-rib such that a toe space is formed between the bottom surface of the stringer and the floor;

4. A valance that is securely attached to the forward surface of the short arm of the inverted J-rib; and 5. A removable chase cover attached to the surface of the extended arm of the J-rib that is shaped with the J-pockets;

the support subassembly adapted to mate with and provided support for the horizontal work surface and to mate with one or more vertical end panels; and C. A plurality of vertical end panels, each equipped with at least one glide, that are adapted to mate with and provide support for the work surface at the side edges of the work surface, and to mate with the forward, vertical support panel subassembly.

The workstations can include a riser subassembly that can be as simple as a single privacy panel, or include courtesy and transactional shelves along equipped with lighting and valances. The riser subassembly is designed to accept riser end panels, and the horizontal work surface is further designed to join with other such surfaces of similar or different geometry to form an extended work surface which accepts end panels only at its terminal ends.

Optional accessories that can be incorporated into the workstation include such items as pull-out writing shelves and pencil drawers that can be attached to the underside of the horizontal work surface; free-standing lateral files, drawer pedestals, cupboard cabinets, and open bookcase units, all of which can be positioned beneath the work surface; intermediate support panels; adjustable glides or load levelers, and mobile floor mounts, e.g. casters; transactional shelves; flat panels of a variety of compositions, including glazing and tack boards, slat boards for holding accessories, and acoustical/fabric covered panels; universal or nonhanded end panels; riser end panels to finish upper riser assemblies that may occur in the middle of a workstation; localized air supply with or without temperature control and /or filters; air exhaust; lighting; bumpers; various appliances, e.g. sinks, refrigerators, etc.; and the like.

BRIEF DESCRIPTION OF THE DRAWINGS

FIG. 2A–2G are side illustrations of various workstation elements and subassemblies, singularly or in combination with one another.

FIG. 3A–3D are side illustrations of various end panel configurations.

FIG. 7B is a side, cross-sectional view of the floor mount of the subassembly of FIG. 7A.

FIG. 8 is a bottom elevation of a section of a horizontal work surface.

FIG. 9A is a front elevational, sectional wire diagram of one embodiment of a workstation of this invention.

DESCRIPTION OF THE PREFERRED EMBODIMENTS

Figure 1A:
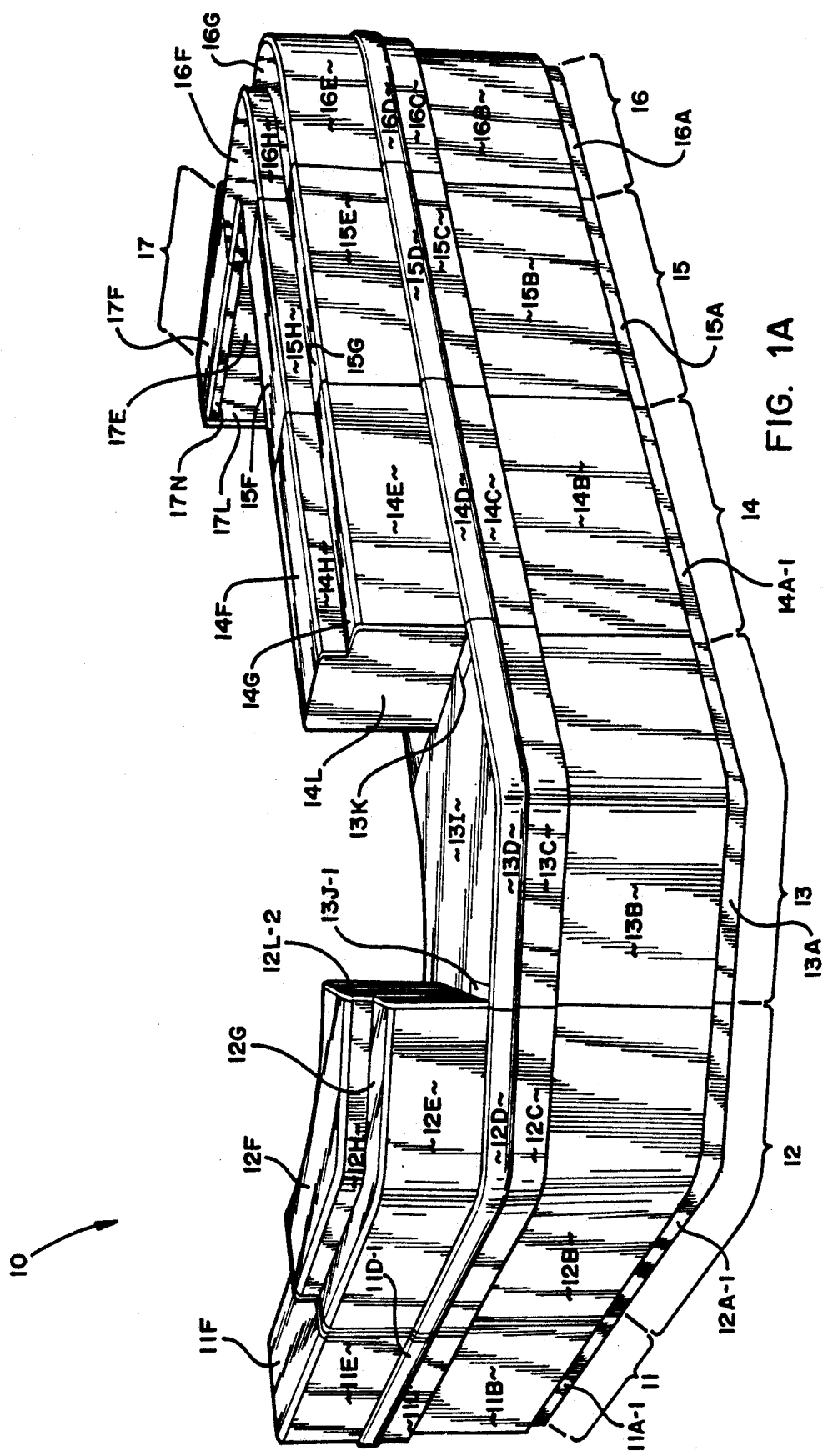
FIG. 1A is a front elevation of one embodiment of a workstation of this invention.

The workstations of this invention are comprised of one or more modules, which in turn are comprised of one or more subassemblies and elements or parts. The subassemblies are comprised of elements which, for purposes of this invention, are the basic building blocks of the workstations.

The heart of a workstation is the workstation module which comprises at the least, a horizontal work surface and a forward support subassembly. The basic workstation module may or may not include one or more vertical end panels depending upon its placement in the workstation. If the module is free-standing, then end panels are present. If the module is joined to one or more other modules, then the end panels may be present or absent.

The footprint of each module, sometimes referred to as a workstation unit, is determined by its horizontal surface and while the sizes and shapes of theses surfaces can vary, the basic geometric shapes have at least two straight edges, e.g. rectangles and corners. For manufacturing reasons, work and other flat surfaces are usually sized on a dimension of 12"×16", or a multiple thereof, although rectangles sized at 30"×48", 30"×60", or 30"×72" are also frequently used. The larger rectangular surfaces are designed for easy field cutting to the next smaller size, or if necessary, to fit to architectural detail. Typical corners are shaped at 90, 60 or 45 degree angles, preferably with rounded corners.

Pull-out writing shelves and pencil drawers can be attached to the undersides of any of the work surfaces, although such accessories are preferably attached to the undersides of the rectangular surfaces. These accessories are sized to allow side-by-side groupings.

Lateral files, open book shelves, and other pedestal furniture are also typically fitted under the rectangular work surfaces, although this kind of furniture can be fitted under any horizontal surface regardless of its geometric shape. Pedestal furniture can be securely fastened to the workstation, thus adding to its mass and permanent look and feel, or it can simply be positioned under a worksurface without fastening it to the module. In such instances, the pedestal furniture can be equipped with mobile floor mounts for easy repositioning or use apart from the workstation itself.

The vertical panels and subassemblies, e.g. the forward support subassembly and the end and middle leg panels, are the primary structural components or "backbone" of the modules. Besides providing support to the other components or parts of the module or workstation, the subassemblies frequently house utility chases within the interior volume defined by their forward (e.g. chase cover) and rear (e.g. kick panel) walls. Subassemblies that house utility chases are equipped with removable front walls for ready access to the chases from outside the workstation. Typically, such chases are confined to the forward support subassemblies, and are not located in an end panel subassembly.

Power and data cables and various utility lines, e.g. water, air, etc., can be brought to the workstation from an architectural connection directly below the workstation or from an adjacent wall, and all wires and terminals can be safely and neatly organized within the chase. The chases are designed to readily accept emergency power cables and small utility pipes and lines.

The subassemblies that contain chases comprise forward and rear walls attached to one another by one or more ribs which typically are in the shape of a generally rectangular fishhook or J. In the forward support subassembly, the rear wall (i.e. the kick panel) is a load supporting wall, while the forward wall (i.e. the chase cover) is a nonload supporting wall and is designed for easy removal from the ribs. The walls are attached to the ribs such that their planar surfaces are substantially parallel to one another.

The width of the extended arm of the J-rib usually defines the distance between the interior surfaces of the forward and rear walls. The ribs contain pockets, typically also J-shaped, through which wiring and utilities can be strung and supported. Access to the chase is readily available by removal of the front wall. Such access allows repair or modification of the wiring or utilities without disruption of the workstation activities.

The end and middle leg panels are usually equipped with adjustable floor mounts or levelers to allow the workstation to be installed in a level position, and to take up minor variations in the floor surface as well. Nonpowered modules, i.e. modules without wiring or utility connections to other modules or the architecture, can be mounted on guides, wheels, casters, etc. for mobility. The floor mounts are covered by a toe molding or mop board that visually is in contact with the floor over its entire length such that it imparts the look of a millwork product. In one embodiment, this toe molding is recessed relative to the chase cover or front wall of the forward support subassembly. Mobile modules are usually not equipped with toe molding.

Riser subassemblies, riser forward and side support panels, and various courtesy and transactional counters provide functional work space above the horizontal work surfaces. The riser subassemblies are typically sized such that a user, when seated, is provided with visual privacy and when standing, is provided with a transactional counter of approximately chest height.

The space defined by the underside of the transactional counter and the topside of the horizontal work surface is sufficiently large to accommodate a computer terminal or similar office machine. The courtesy counter is typically positioned lower than the transactional counter to provide a user on the outside of the workstation with a comfortable ledge upon which to place personal items or arms or elbows during the course of a transaction. The riser side panels are sized in half- and full-heights, depending on whether the riser subassembly is at the end or in the middle of a workstation, the half-height side panel for use with riser subassemblies positioned in the middle and the full-height side panels for use with riser subassemblies positioned on the ends. The forward riser panels or subassemblies are sized to provide the desired visual shield/transactional counter height.

The preferred construction materials for the workstation elements are metal, preferably iron, steel or aluminum, for the bracketry and connect hardware; particle board, preferably formaldehyde-free, and plywood, preferably high density, for the ribs and the cores of the panels and work surfaces; and plastic laminates and molded plastics, e.g. urethane, polyester, etc., for the surfaces of panels and work surfaces, and the edging and trim. This combination of materials produces very durable, rigid assemblies that when coupled with one another, produce a workstation of substantial mass and that is well suited for heavy use settings, such as health care facilities.

Molded edges are a preferred feature of the workstations of this invention. These edges provide a plethora of benefits, including tight seals for infection control and easy maintenance; bumper protection for both the workstation and its users; excellent bonding to assembly laminations and cores with excellent protection for both from damage and moisture; facile shaping to accommodate ergonomic concerns; and one piece construction. The edges are molded to the workstation elements at the factory.

The workstations of this invention comprise elements and subassemblies that are constructed off-site under conditions that insure uniform quality control, and the components can be shipped to the site or a subassembly location in a knock-down, flat condition. The horizontal surfaces, forward support and end panel subassemblies, and end panels are shipped as finished units, as are the riser subassemblies and panels, various shelves, and other elements. These elements and subassemblies can then be assembled or reconfigured on-site by unskilled or low skilled labor with conventional hand tools.

The workstations of this invention are further described by reference to the embodiments depicted in FIGS. 1-10B in which like numerals are employed to designate like parts throughout the same. Various items of equipment, such as fasteners, fittings, etc., are omitted so as to simplify the description. However, those skilled in the art will realize that such conventional equipment can be employed as desired.

In FIG. 1A, a workstation 10 designed for use as a nursing station in a health care facility is shown from the outside and comprises modules 11-17. The basic shape of modules 11, 14-15 and 17 is rectangular, and the basic shapes of modules 12, 13 and 16 are 45, 45 and 90 degree corners, respectively. Although each module can be assembled as a free-standing unit, those is this figure comprise a monolithic workstation. The modules are joined together by fasteners (not shown), and some share certain common elements, e.g. horizontal work surface 13*i*, and various end panels and riser end panels (not shown).

Each module has its own mop board 11*a*-1, 12*a*-1, 13*a*, 14*a*-1, and 15*a*-16*a*, forward support panel assembly 11*b*-16*b*, valance 11*c*-16*c*, and bumper 11*d*-1-16*d*. Module 17 also has these features, but they are not shown. Module 11 is equipped with a forward riser panel 11*e* and standing transactional shelf 11*f*. Modules 12 and 14-16 are equipped with forward riser panels 12*e* and 14*e*-16*e*, standing transactional shelves 12*f* and 14*f*-16*f*, courtesy shelves 12*g* and 14*g*-16*g*, and courtesy riser panels 12*h* and 14*h*-16*h*, respectively. Module 17 is equipped with a standing transactional shelf 17*f* to which valance 17*n* is attached. Module 17 does not include a courtesy shelf. End panel 17L forms one side wall of module 17 and an end wall of the workstation. Riser end panel 12L-2 and the top segment of end panel 14L provide closure and support the to the riser assemblies of modules 12 and 14. Module 13 is capped simply with half of double horizontal work surface 13*i* which contains grommet holes 13*j*-1 and 13*k*. Modules 12 and 14-17 are also equipped with horizontal work surfaces, but these are not shown.

Figure 1B:
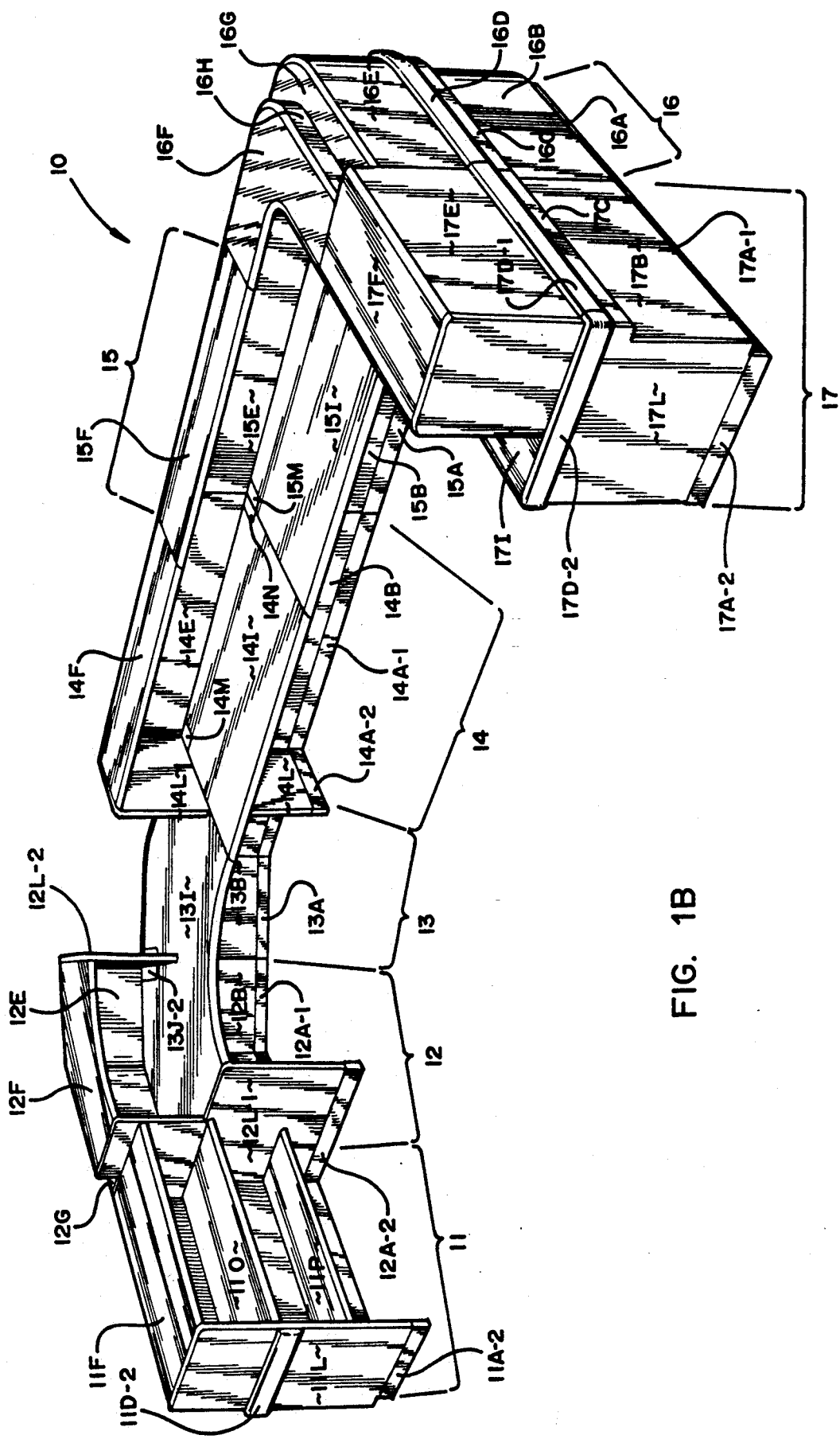
FIG. 1B is a rear elevation of the workstation of FIG. 1A.

FIG. 1B is a rear elevation of the workstation of FIG. 1A. This view shows the inside of the workstation and with respect to module 11, it shows mop board 11*a*-2, end panel 11L, bumper 11*d*-2 and bookshelves 11*o* and 11*p*. Modules 11 and 12 share end panel 12L-1 which is equipped with mop board 12*a*-2. The horizontal work surface of module 12 is the other half of double horizontal work surface 13*i*, and this half contains grommet hole 13*j*-2.

Modules 14 and 15 contain horizontal work surfaces 14*i* and 15*i*, respectively, each with their own grommet holes 14*m*, 14*n* and 15*m*. End panel 14L is equipped with mop board 14*a*-2. Module 17 is equipped with mop boards 17*a*-1 and bumpers 17*d*-1 and 17*a*-2, bumpers 17*d*-2 and horizontal work surface 17*i*.

Each module is securely fastened to the module(s) adjoining it by means not shown. The mop boards of each module are recessed from the forward support subassembly such that a toe space is formed. The mop boards conceal the floor mounts attached to the forward support subassemblies and end panels. All of the edges of the various modules, subassemblies and modules are ergonomically shaped.

FIG. 2A-2G illustrate embodiments of certain elements and subassemblies and their attachment to one another. FIG. 2A shows a horizontal work surface 31 with a tapered front edge 32 and a straight back edge 33. FIG. 2B shows a forward support panel assembly 34 comprising a rearwall (also known as a kick panel) 35*a*, a mop board subassembly 35*b*, a J-rib 36*a* attached to bottom stringer 36*b* and equipped with J-pockets 37*a* and 37*b*, removable frontwall (also known as a chase cover) 38, forward trim panel (also known as a valance) 39, and a bumper 40 the top edge of which extends above the top edge of the valance. The volume defined by the interior surfaces of frontwall 38, rearwall 35*a*, bottom stringer 36*b* and J-pockets 37*a* and 37*b* define a utility chase through which wiring and utilities can be strung and supported. The removal of frontwall 38 provides ready access to the chase without disruption to activities in progress on the inside of the workstation.

FIG. 2C shows horizontal work surface 3 joined to forward support panel assembly 34 (fasteners not shown) such that straight back edge 3 is flush with the forward edge of forward trim panel 39 and flush with the top edge of bumper 40. This illustration also shows the placement of light fixture 41 such that it is both concealed behind forward trim panel 39 and to provide illumination to the chase cover.

FIG. 2D-2G show various module configurations that can be constructed from the basic structure of FIG. 2C. Light fixture 41 is omitted from these figures. In FIG. 2D, forward riser panel 42 is attached to the straight back edge 33 of horizontal work surface 31 as a privacy screen. In FIG. 2E, transactional shelf 43*a* is added to riser panel 42, and is equipped with a valance 43*b*. In FIG. 2F, courtesy counter 44 and courtesy riser 45 are inserted between riser panel 42 and transactional shelf 43*a*. In FIG. 2G, extended riser panel 46 is substituted for riser panel 42, and task light 48 is added to its undersurface. Valance 47*b* conceals task light 48.

In FIG. 3A-3D, the footprints of various end panels and end panel subassemblies and riser end panels are shown. These panels can be used on either the right or left sides of the workstation or module. FIG. 3A is the footprint of a full-height end panel or subassembly for a workstation or module with a courtesy shelf. This end panel or subassembly also has support for a horizontal work surface that extends beyond a riser end panel.

The solid outline of FIG. 3B is the footprint of a full-height end panel or subassembly for a workstation or module with a courtesy shelf but without the added support for a horizontal work surface that extends beyond a riser end panel. If the broken line is the top edge of the FIG. 3B, then the footprint is that of a full-height end panel or subassembly without a courtesy shelf.

The solid outline of FIG. 3C is the footprint of a riser end panel or subassembly for a workstation or module with a courtesy shelf. The square defined by the addition of the broken line at a 90 degree angle to FIG. 3C is the footprint of an end panel for a riser subassembly without a courtesy shelf. The rectangle defined by the addition of the straight broken line to FIG. 3C is the footprint of an end panel for a low-height riser such as riser 42 in FIG. 2E.

FIG. 3D is the footprint of a half-height end panel or subassembly.

Figure 4A:
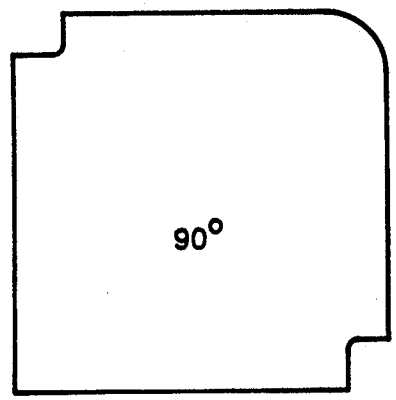
FIG. 4A–4C are top illustrations of various horizontal work surface corner configurations.
Figure 4B:
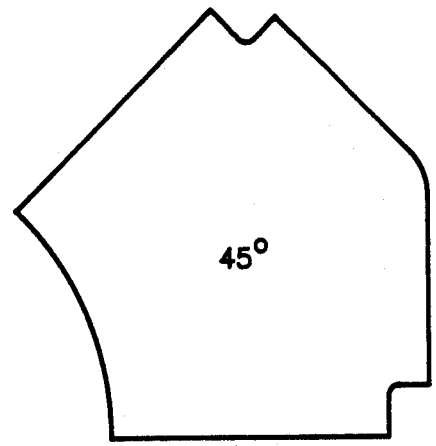
Figure 4C:
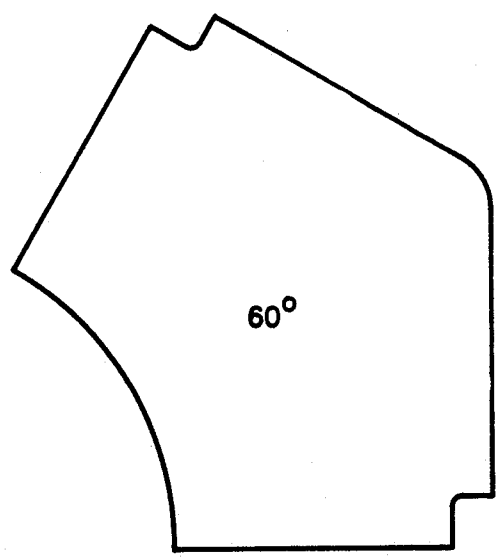

In FIG. 4A-4C, the footprints of 90, 45 and 60 degree horizontal work surface corners are shown, respectively. Each of these surfaces are notched to provide a grommet hole through which wiring and utilities can be brought from beneath the horizontal work surface to above it, and each provide a basic geometric module footprint from which monolithic workstations of various configurations can be arranged.

Figure 5A:
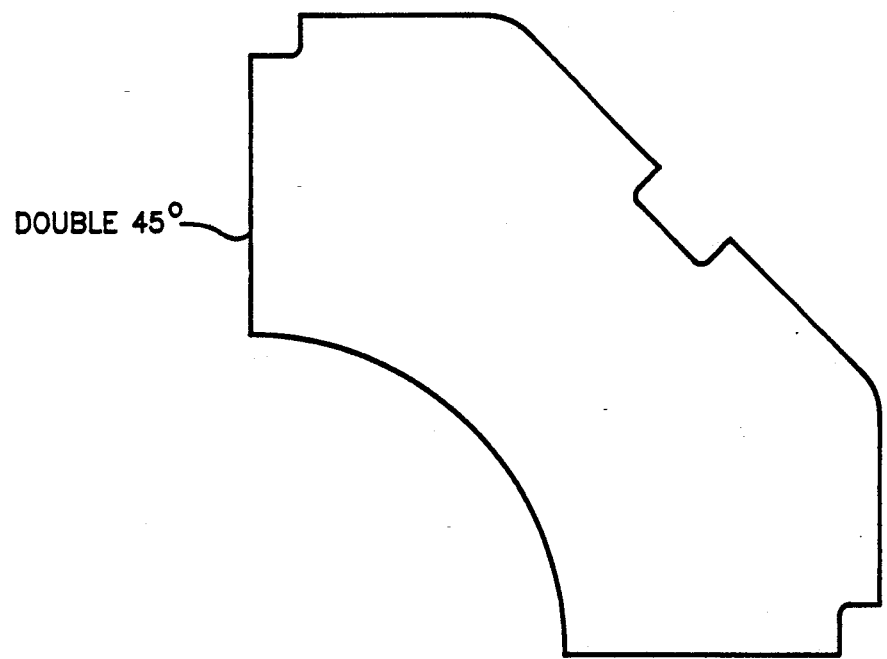
FIG. 5A–5B are top illustrations of various double length horizontal work surface configurations.
Figure 5B:
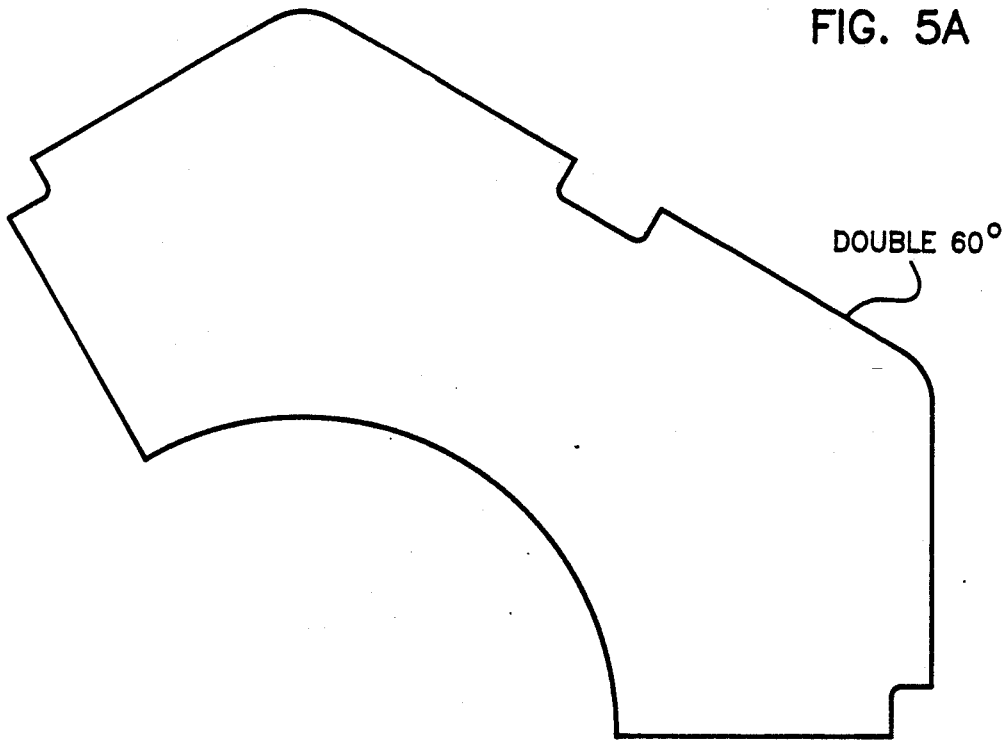

In FIG. 5A and 5B, extended or double 45 and 60 degree horizontal work surface corners are shown. When properly supported at their straight edges, these extended corners do not require the support of a middle support panel or subassembly.

Figure 6A:
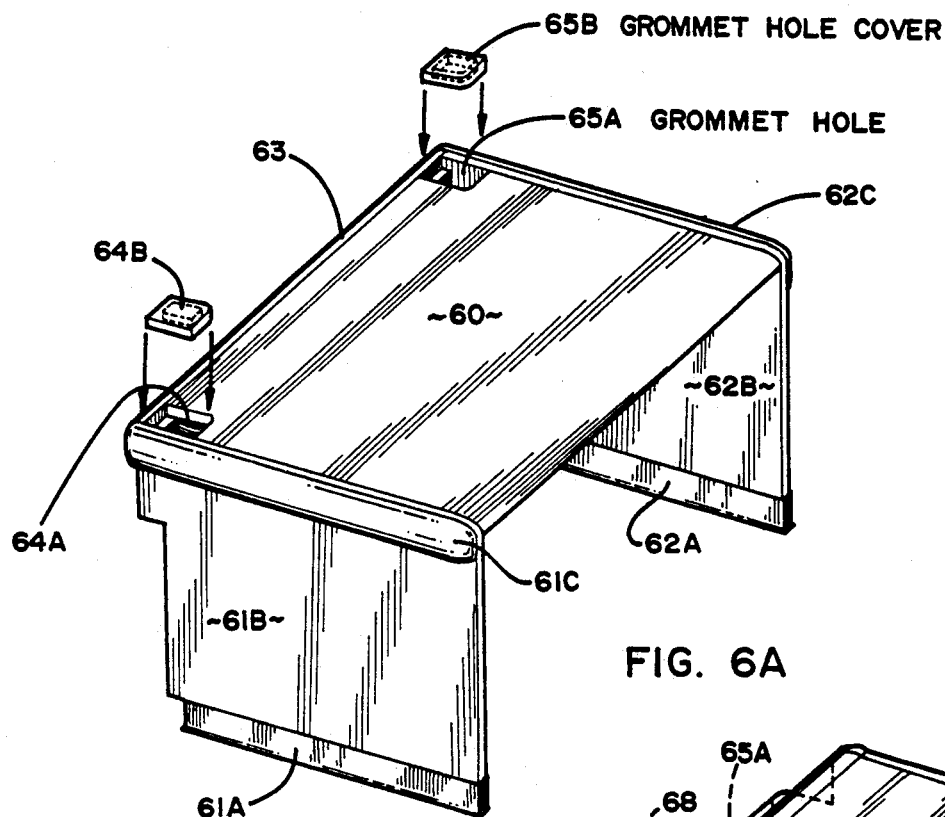
FIG. 6A is a side elevation of one embodiment of a basic module with half-height end panels.

FIG. 6A illustrates a basic, rectangular module. Horizontal work surface 60 is securely attached to end panels 61*b* and 62*b* which are equipped with mop boards 61*a* and 62*a* and bumpers 61*c* and 62*c*, respectively. Work surface 60 is notched at its rear corners to form grommet holes 64*a* and 65*a* through which wiring and utilities ca be brought to the top of the surface from underneath the surface. If wiring and/or utilities are not needed at the workstation, then the holes are plugged with grommet covers 64*b* and 65*b*. These covers can be made from any suitable material, but are typically fashioned from a moderately flexible plastic, such as a urethane. Bumper 63 fronts the rear edge of work surface 60.

Figure 6B:
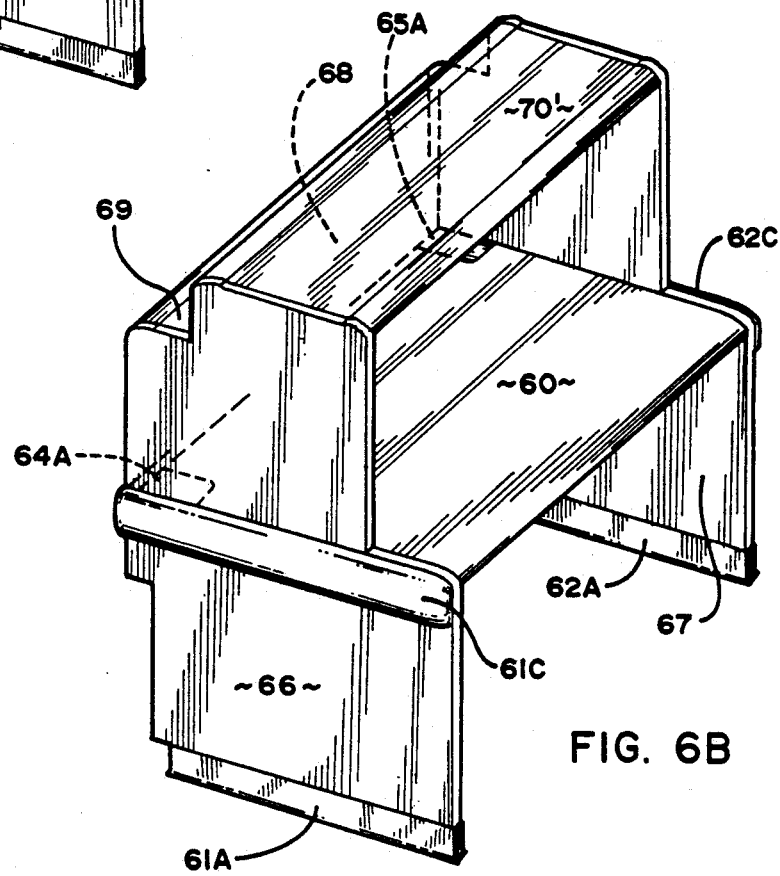
FIG. 6B is a side elevation of one embodiment of a basic module with full-height end panels and courtesy and transactional shelves.

FIG. 6B is the FIG. 6A module with a riser subassembly. Full-height end panels 66 and 67 are substituted for half-height end panels 61b and 62b, and forward riser panel 68, courtesy shelf 69 and standing transactional shelf 70 are added. In similar fashion, other modules can be assembled.

Figure 7A:
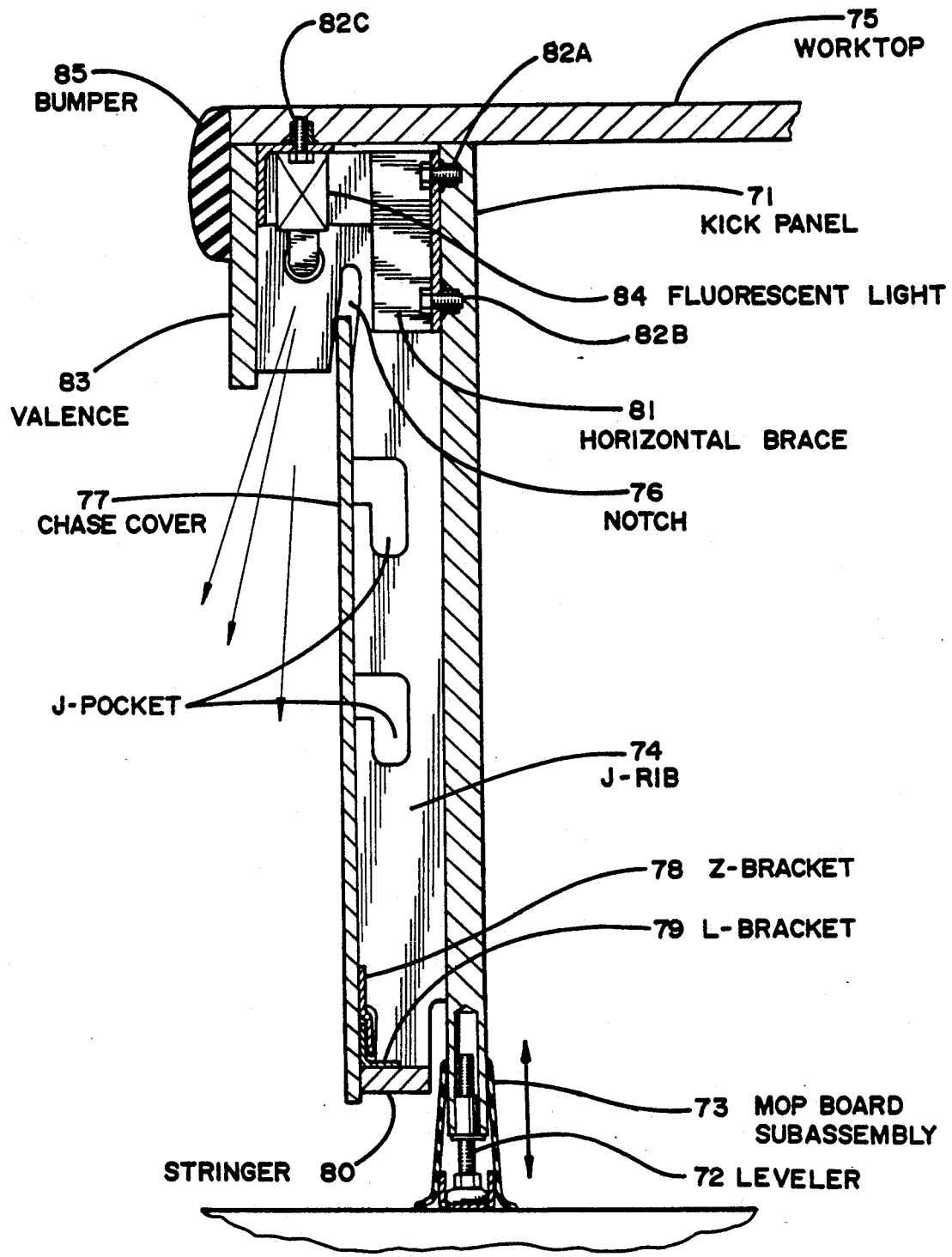
FIG. 7A is a side, cross-sectional view of one embodiment of a forward, vertical support subassembly.

FIG. 7A is a side illustration of one embodiment of a forward support subassembly. Kick panel 71 is equipped at its lower edge with a leveler (also known as an adjustable floor mount) 72 which is enclosed by mop board subassembly 73. J-rib 74 is securely affixed to the inner surface of kick panel 71 by means not shown and in an inverted fashion such that the base of the J is proximate horizontal surface or worktop 75 and the top of the extended arm of the J is proximate leveler 72. The base of the J rib contains a tapered notch 76 into chase cover 77 can be inserted and subsequently held in place in a rigid manner when Z-bracket 78, which is securedly affixed to the inner surface of chase cover 77, mates with L-bracket 79, which is securely affixed to the top surface of bottom stringer 80. Placement of chase cover 77 over J-rib 74 requires pushing the top edge of chase cover 77 sufficiently far into notch 76 such that the bottom edge of the Z-bracket clears the top edge of the L-bracket. Chase cover 77 is then pushed flat against J-rib 74 and allowed to descend until Z-bracket 78 and L-bracket 79 mate. At this point, the top edge of chase cover 77 is still within notch 76 such that it is held firmly in place.

Horizontal brace 81 is attached to kick panel 71 by bolts 82a and 82b. Worktop 75 is attached to brace 81 by bolt 82c, and valance 83 is also attached to brace 81 by means not shown. Within brace 81 is affixed fluorescent accent light 84. Attached by means not shown is bumper 85 such that its top edge is flush with the top surface of worktop 75.

In FIG. 7B, mop board subassembly 73 of FIG. 7A is shown in greater detail. Kick panel 71 contains bore 86 in its bottom edge. Nut insert 87 is securely affixed to the walls of bore 86, and leveler is threaded into it. Mop board subassembly 73 encloses leveler 72 and the lower edge of kick panel 71. Subassembly 73 includes a metal channel comprising channel walls 88a and 88b, and channel floor 88c. The metal channel runs the substantial length of kick panel 71, and channel floor 88c contains holes of sufficient size and aligned with the levelers of kick panel 71 such that subassembly 73 can be lifted to expose the levelers. J-rib 74 and bottom stringer 80 are shaped to create a clearance notch 89 of sufficient size to allow mop board covers 88d and 88e, which are securely attached to channel walls 88a and 88b, respectively, to be lifted in such a manner as to provide adequate access to leveler 72 to permit its adjustment. When assembly 73 is in a lowered state, the lower edges of mop board covers 88d and 88e form a seal with the floor.

FIG. 8 illustrates several means by which the various elements and subassemblies can be joined to one another. Cam-lock fasteners can be used to join two edges together, such as the abutting edges of two horizontal work surfaces. Thumb screws can be used to join an edge of a horizontal work surface of shelf with an end riser or subassembly. Both of these fasteners are commercially available.

Figure 9B:
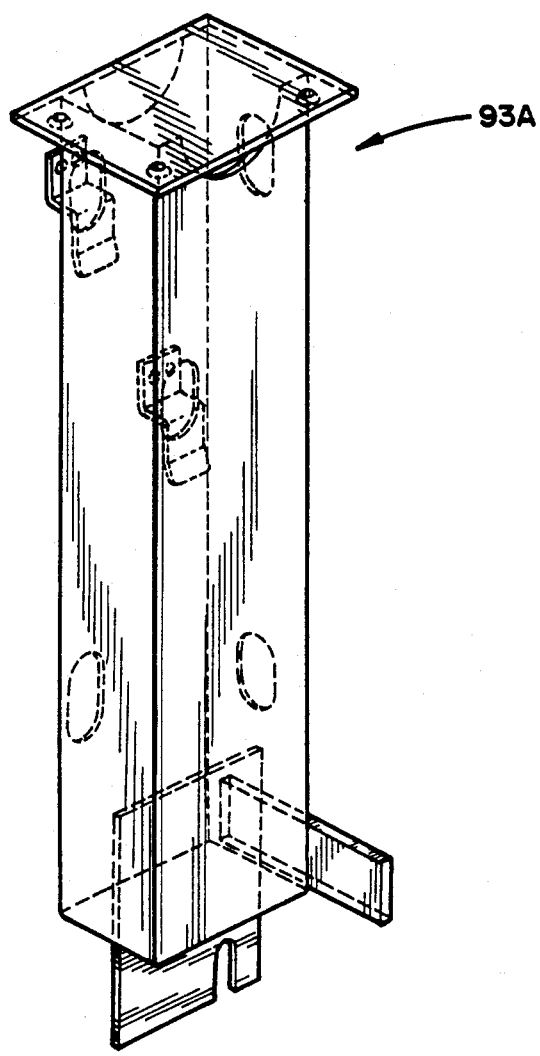
FIG. 9B is a side elevation of a vertical brace.
Figure 9C:
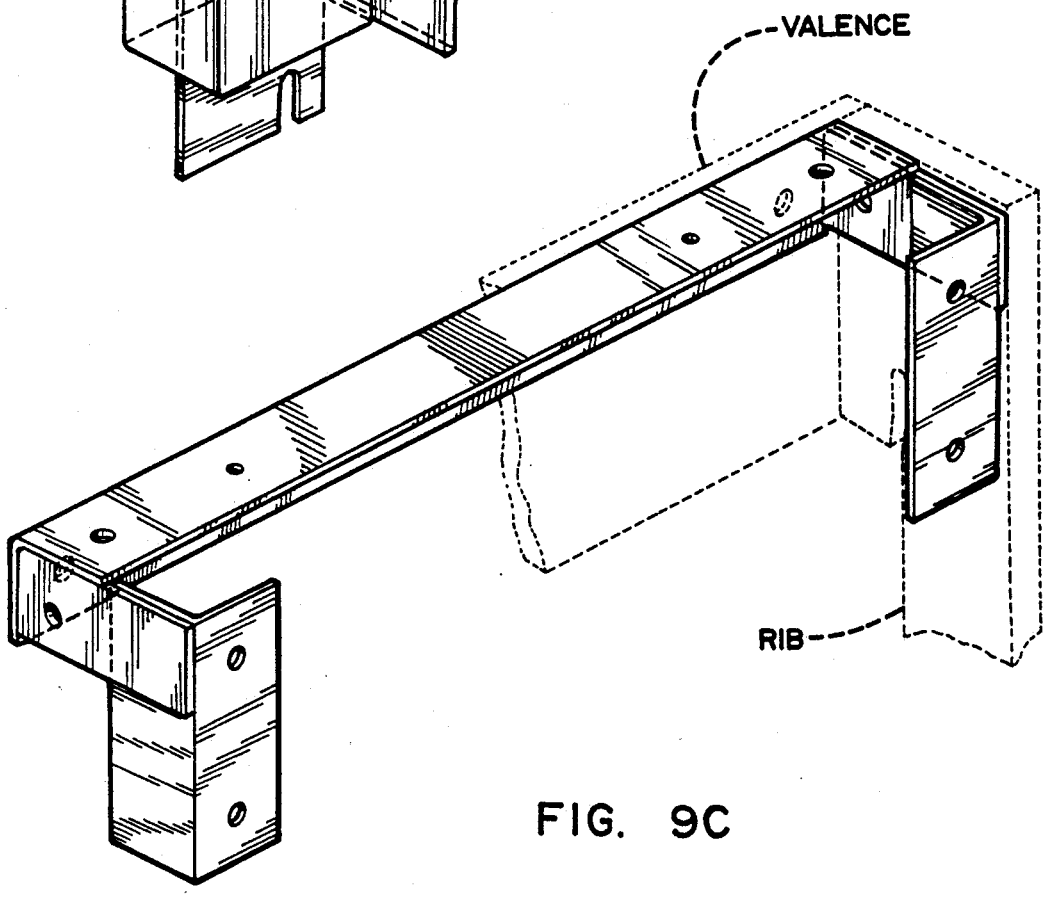
FIG. 9C is a side elevation of a horizontal brace.

With respect to assembly of a workstation or module, the various components are designed with built-in support devices, and these are illustrated in the wire-frame diagrams of FIG. 9A-9C. In FIG. 9A, transactional shelf 90 has T-shaped fastener slots 91a-91d carved into its bottom surface into which conventional fasteners, e.g. cam-locks, thumb screws, etc. can be inserted. Shelf 90 is designed to be secured to riser 92 and riser end panels (not shown). Riser 92 includes vertical support braces 93a and 93b which are designed to provide both structural support to riser 92, and as a means for coupling the module that incorporates riser 92 to the adjoining modules through vertical support braces 94a and 94b, shelf 90 to the riser, and the riser to forward support panels 97a, 97b and 97c, the latter by way of horizontal braces 95a, 95b and 95c. Levelers 98a-98f allow leveling of the workstation or module, and the seams between the various forward support panels, e.g. the seam between panels 97a and 97b, are covered by a molding. The horizontal braces are also designed to fasten to horizontal work surface 96.

In FIG. 9B, vertical brace 93a is shown in greater detail. The brace is a hollow, rectangular structure made of any suitable construction material, e.g. steel, wood, plastic composite, etc., and it is designed to provide both structural integrity to the subassembly in which it is incorporated and as a vehicle for coupling one element or subassembly to another.

In FIG. 9C, horizontal brace 95a is shown in greater detail. Like vertical brace 93a, this brace is a hollow, rectangular structure made of any suitable construction material, and it too is designed to provide both structural integrity to the subassembly in which it is incorporated and as a vehicle for coupling one element or subassembly to another.

Figure 10A:
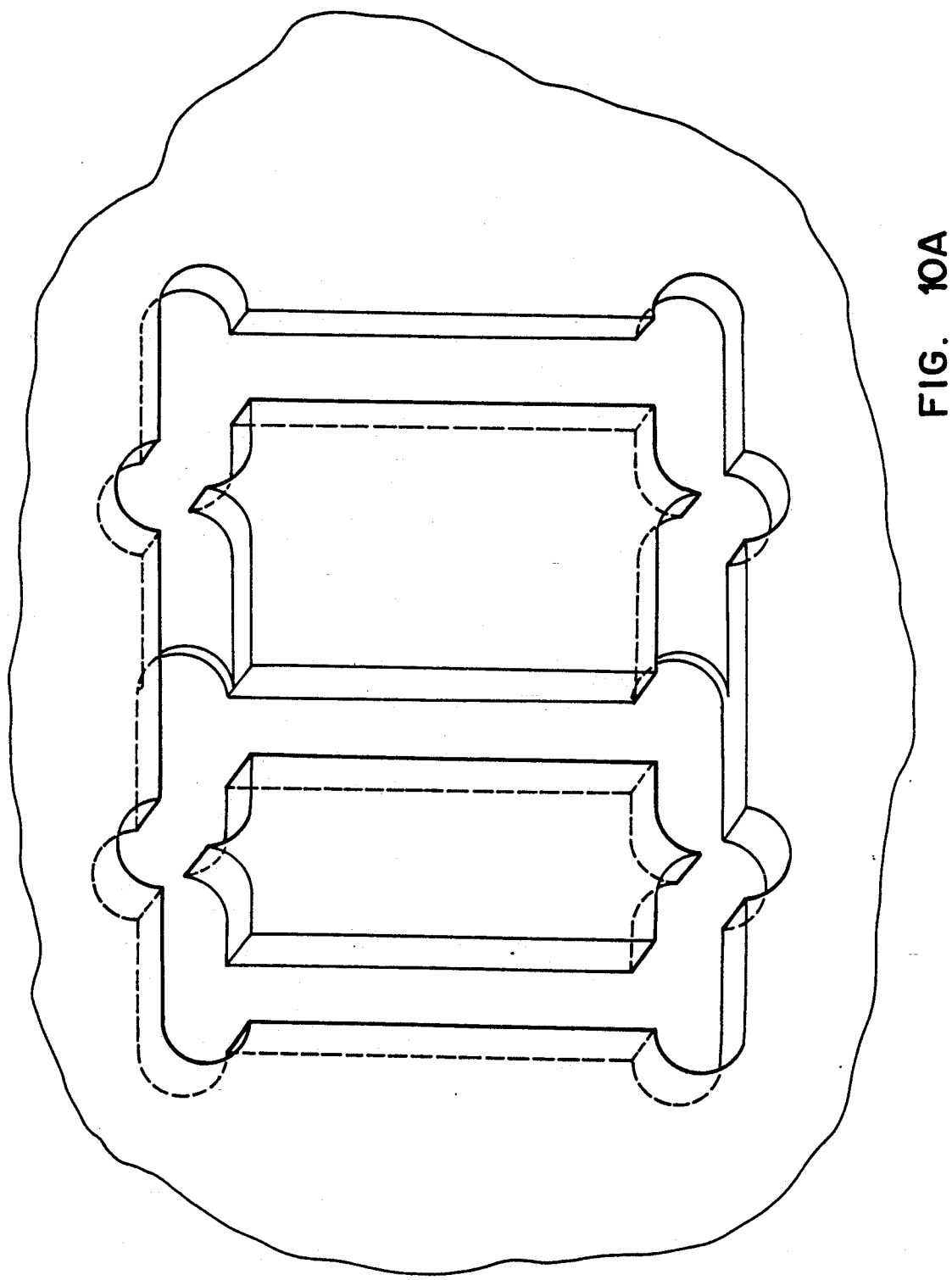
FIG. 10A is a front view wire diagram of a double electrical outlet knockout.
Figure 10B:
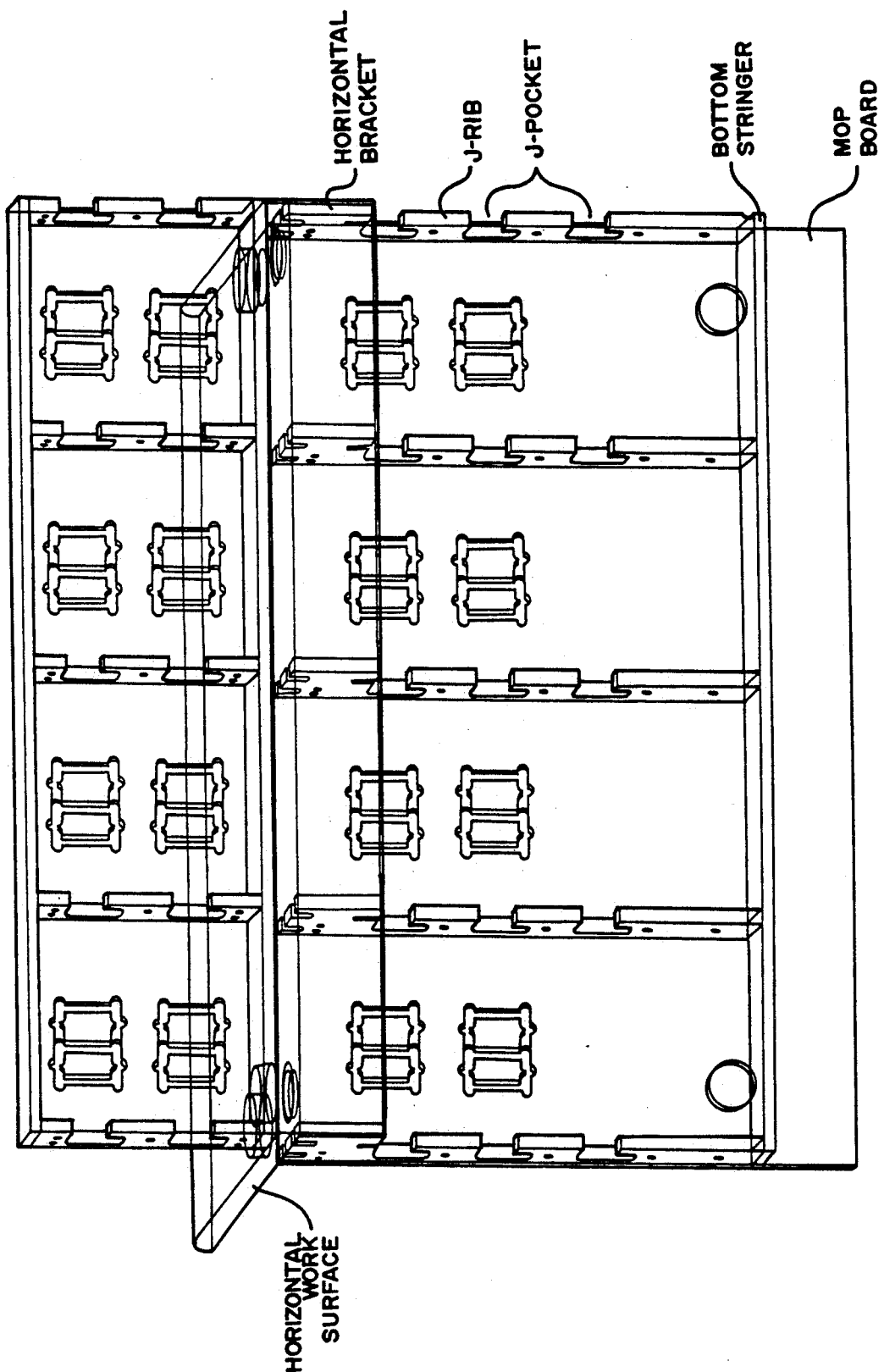
FIG. 10B is a front perspective, wire diagram of a vertical support subassembly with attached riser panel subassembly, each with double electrical outlet knockouts.

FIG. 10A is a wire diagram of a double electrical outlet that, in some embodiments of this invention, can be incorporated into one or more panel members of the workstation. Since placement of the outlets will vary with the demands of the workstation, panels can be designed with knockouts incorporated into the panel walls. Typically, the outlines of these knockouts will not be visible from the user side of the panel, and will be etched into the backwall of the panel such that only nominal cutting is required to remove it. FIG. 10B illustrates one placement of these knockouts.

As is readily evident from the preceding description of the workstations of this invention, all of the modules are formed from a relatively limited number of subassemblies and elements. This enables manufacture of the workstations at a reduced cost relative to millwork stations or furniture systems due to reduced tooling requirements. It also enables relatively easy assembly and reconfiguration.

Although certain embodiments of the workstations of this invention have been described in considerable detail by reference to the figures, this detail is provided for purposes of illustration only and is not to be construed as a limitation on the invention as described in the following claims.

What is claimed is:

1. A modular workstation suitable for institutional use, the workstation having the appearance of architectural millwork but with the reconfiguration flexibility of furniture systems, adapted for flat shipping and storage but facile on-site assembly with conventional hand tools, and designed and detailed for clean, sanitary maintenance, the workstation comprising a series of modular subassemblies and elements, including:

A. A horizontal work surface with forward and back and at least two straight side edges, wherein the forward edge faces a direction from which service is dispensed;

B. A forward, vertical support subassembly comprising: an inner kick panel, at least one generally rectangular inverted J-rib, a forward chase cover, a bottom stringer, and a valence, wherein:

1. The kick panel further comprises an upper and lower edge, inner and outer surfaces and at least one floor mount, and the floor mount both is securely attached to the lower edge of the kick panel and supports the vertical support subassembly and workstation;

2. The J-rib includes a base, a short arm and forward, rear, and top surfaces of an extended arm, and is securely attached to the inner wall of the kick panel in an inverted manner such that:
   i. The base of the J-rib is proximate to the horizontal work surface and the top of the extended arm of the J-rib is proximate to the floor mount;
   ii. The forward surface of the extended arm of the J-rib is shaped with at least one J-shaped pocket through which wiring and utilities can be strung and supported;
   iii. The rear surface of the extended arm of the J-rib is securely attached to the kick panel; and
   iv. The base of the J-rib is notched such that the chase cover can be inserted and, in combination with a lower fastening means, can be removeably secured in close proximity to the forward surface of the extended arm of the J-rib;

3. The chase cover is a non-load supporting panel and may be easily removed from the J-rib in a manner not disruptive of the normal work activities of the work station;

4. The bottom stringer, comprising an upper and lower surface, is substantially parallel to the plane of the horizontal work surface, extends for the substantial length of the kick panel, and the upper surface of the stringer is securely attached to the top of the inverted J-rib in a manner such that a toe space is formed between the bottom surface of the stringer and the floor; and 5. The valence is securely attached to the forward surface of the short arm of the inverted J-rib;

in which the vertical support subassembly is adapted to mate with and provide support for the horizontal work surface at the rear edge of the horizontal work surface and to mate with at least one vertical end panels; and C. a plurality of vertical end panels, each comprising at least one floor mount and each adapted to mate with and provide support for the horizontal work surface at the side edges of the horizontal work surface, and to mate with the forward vertical support subassembly.

2. The modular workstation of claim 1 in which the edges of the horizontal work surface are molded.

3. The modular workstation of claim 1 which further comprises at least one grommet hole notched from a forward corner of the horizontal work surface, through which wiring and utility lines may pass, and which may be covered in a manner to appear that the horizontal work surface is non-perforated.

4. The modular workstation of claim 1 in which a riser subassembly is mated to an upper edge of the forward vertical support assembly comprising upper, lower and side edges.

5. The modular workstation of claim 4 in which the riser subassembly consists of a substantially vertical riser panel adapted to securely mate to the upper edge of the forward vertical support subassembly, and at least one riser end panel adapted to:

A. Mate with and provide support for the vertical riser panels at a side edge of the vertical riser panel; and B. Mate with the upper edge of the forward vertical support assembly and provide support for the riser subassembly.

6. The modular workstation of claim 4 in which the riser subassembly comprises:

A. A vertical riser panel adapted to securely mate to the upper edge of the forward vertical support subassembly;

B. A transactional shelf, substantially parallel to the horizontal work surface, comprising forward, back and side edges, wherein the back edge faces a direction from which service is dispensed, and the forward edge is adapted to securely mate to the upper edge of the vertical riser panel.

7. The modular workstation of claim 6 in which the riser subassembly comprises:

A. A vertical riser panel comprising upper, lower and side edges, which is adapted to securedly mate to the upper edge of the forward vertical support subassembly;

B. A transactional shelf, substantially parallel to the horizontal work surface, comprising forward, back and side edges, wherein the back edge faces a direction from which service is dispensed, and the forward edge is adapted to securely mate to the upper edge of the vertical riser panel;

C. At least one riser end panel further adapted to:
   1) mate with and provide support for the vertical riser panel at the side edges of the vertical riser panel; and
   2) mate with and provide support for any adjacent transactional panels, where such support is provided at the side edges of the transactional panel.

8. The modular workstation of claim 4 in which the riser subassembly comprises:

A. A substantially vertical riser panel comprising upper, lower and side edges, which is adapted to securely mate with the upper edge of the forward vertical support assembly;

B. A courtesy counter, substantially parallel to the horizontal work surface and comprising forward, back and side edges wherein the forward edge both:
   1. Faces the direction from which service is requested; and
   2. Is adapted to mate securely with the upper edge of the vertical riser panel;

C. A courtesy riser panel which is substantially parallel to the vertical riser panel and is adapted to securely mate to the back edge of the courtesy counter;

D. A transactional shelf, substantially parallel to the horizontal work surface, comprising forward, back and side edges, wherein the back edge faces a direction from which service is dispensed, and the forward edge is adapted to securely mate to the upper edge of the courtesy riser panel; and E. At least one riser end panel further adapted to:
1. Mate with and provide support for the vertical riser panel at the side edges of the vertical riser panel;
2. Mate with and provide support for any adjacent transactional shelves, courtesy risers and courtesy counters at the side edges of each.

9. The modular workstation of claim 1 in which the back edge of the horizontal work surface is angled at 45, 60 or 90 degrees.

10. The modular workstation of claim 1 in which the metrical support assembly further comprises an adjustable floor mount attached to the lower edge of the kickpanel and which is enclosed by a mop-board subassembly.

11. The modular workstation of claim 10 in which the mop-board subassembly comprises:
A. At least one adjustable floor mount which is attached to the bottom edge of the kickpanel in such a manner as to allow vertical movement of the entire vertical support assembly,
B. Front and back mop board covers which are securely fastened to a metal channel through which the adjustable floor mounts may pass, and
C. The inner surface of the extended arm of the J-rib and the stringer is shaped so as to create a clearance such that the mop-board subassembly may be lifted to adequately expose the adjustable floor mount to permit adjustment;

and the mop-board subassembly forms a visual seal with the floor when in a lowered state.

12. The modular workstation of claim 1 in which separate elements may be connected together by way of vertical and horizontal braces wherein the braces are hollow, rectangular structures which mate separate elements together through attachment of the elements to the braces, and is fabricated of material suffice int to provide structural integrity to the structure into which it is incorporated.

13. The modular workstation of claim 1 wherein the rear surface of an exposed panel comprises a knockout in the shape of an opening for an electrical outlet, wherein the knockout is not visible from the exposed side of the panel and may be removed by nominal cutting.

14. The modular workstation of claim 1 wherein the forward, vertical support subassembly comprises: an inner kick panel, at least one generally rectangular inverted J-rib, a forward chase cover, and a bottom stringer, wherein:
A. The kick panel further comprises an upper and lower edge, inner and outer surfaces and at least open floor mount, and the floor mount both is securedly attached to the lower edge of the kick panel and supports the vertical support subassembly and workstation;
B. The J-rib includes a base, a short arm and forward, rear, and top surface of an extended arm, and is securedly attached to the inner wall of the kick panel in an inverted manner such that:
1. The base of the J-rib is proximate to the horizontal work surface and the top of the extended arm of the J-rib is prostate to the floor mount;
2. The forward surface of the extended arm of the J-rib is shaped with at least one J-shaped pocket through which wiring and utilities can be strung and supported;
3. The rear surface of the extended arm of the J-rib is securedly attached to the kick panel; and
4. The base of the J-rib is notched such that the chase cover can be inserted and, in combination with a lower fastening means, can be removable secured in close proximity to the forward surface of the extended arm of the J-rib;
C. The chase cover is a non-load supporting panel and may be easily removed from the J-rib in a manner not disruptive of the normal work activities of the work station;
D. The bottom stringer, comprising an upper and lower surface, is substantially parallel to the plane of the horizontal work surface, extends for the substantial length of the kick panel, and the upper surface of the stringer is securedly attached to the top of the inverted J-rib in a manner such that a toe space is formed between the bottom surface of the stringer and the floor; and
E. The valence is securedly attached to the forward surface of the short arm of the inverted J-rib;

in which the vertical support subassembly is adapted to mate with and provide support for the horizontal work surface at the rear edge of the horizontal work surface and to mate with at least one vertical end panels.

* * * * *